United States Patent [19]

Petit

[11] Patent Number: 5,784,303
[45] Date of Patent: Jul. 21, 1998

[54] METHOD OF SHAPING A CELL STREAM INCLUDING BOTH USER CELLS AND OPERATION AND MAINTENANCE CELLS

[75] Inventor: Guido Henri Marguerite Petit, Antwerpen, Belgium

[73] Assignee: Alcatel N.V., BH Rijswijk, Netherlands

[21] Appl. No.: 392,467

[22] Filed: Feb. 22, 1995

[30] Foreign Application Priority Data

Feb. 22, 1994 [EP] European Pat. Off. .............. 94200445

[51] Int. Cl.$^6$ ...................................................... G06F 1/02
[52] U.S. Cl. ...................... 364/718.01; 370/232; 370/412
[58] Field of Search ...................... 364/718; 370/17, 370/60.1, 61, 84, 85.6, 94.1, 94.2, 230-234, 395, 412, 442

[56] References Cited

U.S. PATENT DOCUMENTS

| 5,271,005 | 12/1993 | Takase et al. | 370/79 |
|---|---|---|---|
| 5,541,926 | 7/1996 | Saito et al. | 370/94.2 |

OTHER PUBLICATIONS

Computer Communications, vol. 16, No. 12, Dec. 1993, Jordan Hill, Oxford, pp. 794-797, L.F. Merakos, "Priority shaping of source traffic in ATM B-ISDN".

Infocom 1993, vol. 1, 28 Mar. 1993, San Francisco, pp. 168-175, L.K. Reiss, L.F. Merakos, "Shaping of virtual path traffic for ATM B-ISDN".

Study Item 19 on the ITU-TS Living List, "Aggregate of saparate shaping of user cells and (operation and maintenance or) OAM cells".

France Telecom contribution TD 5.1 to ETSII/NA5 of May 10-14, 1993 entitled "Enforcement of OAM cell flows".

"The Spacer-Controller: an efficient UPC/NPC for ATM networks", by P. Boyer et al., ISS 1992, Oct. 1992, vol. 2, paper A9.3, pp. 316-320.

*Primary Examiner*—Reba I. Elmore
*Assistant Examiner*—Emmanuel L. Moise
*Attorney, Agent, or Firm*—Ware, Fressola, Van Der Sluys & Adolphson LLP

[57] ABSTRACT

A shaping method is proposed in which cells (U1-U7, 01-06) of a cell stream (CS1) are mutually delayed to obtain a shaped cell stream (CS2). For this method, a shaping delay is used which depends upon the type of the cells which are so delayed in order for consecutive user cells (U1-U2, U2-U3, ... ) to be mutually delayed over the inverse (TU) of the peak cell rate negotiated for these user cells (U1-U7). The above method is obtained by making this shaping delay equal to the above inverse when adjacent cells are user cells (U1-U2), to a fraction (TU/3) of this inverse when the second one of these adjacent cells is an operation and maintenance or OAM cell (01-07), and to the difference between the above inverse and the number of consecutive OAM cells inbetween two user cells (U5-U6) times the above fraction, if the first one of said adjacent cells is an OAM cell (03) whilst the second one is a user cell (U6).

7 Claims, 2 Drawing Sheets

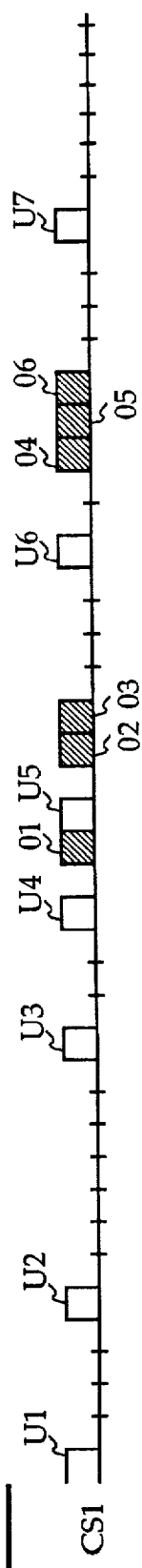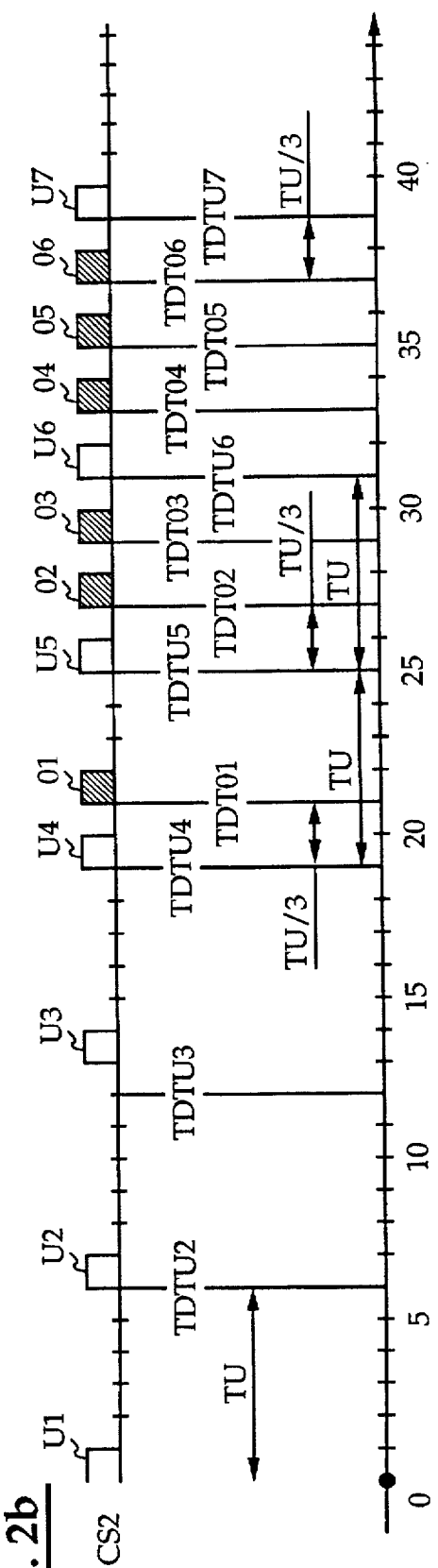
FIG. 2a
FIG. 2b

METHOD OF SHAPING A CELL STREAM INCLUDING BOTH USER CELLS AND OPERATION AND MAINTENANCE CELLS

TECHNICAL FIELD

The present invention concerns a method of shaping a cell stream comprising first and second types of cells and including the step of mutually delaying adjacent cells of said cell stream over a shaping delay if they are received within said shaping delay.

BACKGROUND OF THE INVENTION

Such a method is already known from Study Item 19 on the ITU-TS Living List "Aggregate or separate shaping of user cells and (operation and maintenance or) OAM cells". The first option described in the latter document provides for an aggregate shaping as defined above, i.e. a shaping in which adjacent cells are mutually delayed regardless of their type. In this known method, the shaping delay is a function of the inverse of the sum of the peak cell rates negotiated at call set-up for the cells of the first type, i.e. user cells, and for the cells of the second type, i.e. OAM cells.

As is already known, e.g. from the above document, this known method of aggregate shaping is disadvantageous as it leads to gaps, i.e. mutual delays in excess of the inter-arrival time corresponding to the above negotiated peak cell rate, in the stream of user cells as received by a receiving terminal processing these cells. These gaps increase the cell delay variation experienced by this receiving terminal which is, especially for low bitrate cell streams, unacceptable as the increase in cell delay variation or CDV is tantamount to a decrease in the Quality of Service or QoS.

Therefore, and as is clear from the above mentioned document, currently a number of alternative options not using aggregate shaping are considered. The most promising of these options is the fourth one according to which a user indicates that user or first cells are to be shaped according to a shaping delay equal to the inverse of the peak cell rate of the user cells, whereas the OAM or second cells need not be shaped and should bypass the shaping method.

Whilst the latter option provides a good QoS, it also presents a number of drawbacks some of which are recited in the France Telecom contribution TD 5.1. to ETSI/NA5 of May 10–14, 1993 entitled "Enforcement of OAM cell flows" and more particularly in point 3.1 thereof. One of these drawbacks is that extra signalling is required in order to allow a user to signal whether or not the OAM cells of a specific cell stream should bypass the shaping. Moreover, making such distinctions between cell streams is contrary to a basic principle of the Asynchronous Transfer Mode or ATM, namely that inside the ATM layer all cell streams should be treated equally.

Furthermore, for each cell stream in which the OAM cells bypass the shaping, cell clumping cannot be minimized and particularly it cannot be avoided that cell clumps made up of user and OAM cells of the same cell stream arise. This is also the reason why this bypassing can be only selectively applied. Finally, the cell sequence integrity cannot be guaranteed when OAM cells are allowed to bypass the shaping.

SUMMARY OF THE INVENTION

In view of the drawbacks of the currently preferred shaping method, the present invention proposes a return to an aggregate shaping method as described hereinabove. Therefore it is an object of the present invention to provide a shaping method of the above first mentioned type but in which no gaps are created between user cells whilst cell sequence integrity as well as clumping between OAM cells and OAM and user cells can be minimized.

This object is achieved by virtue of the fact that said shaping method further includes a step of deriving said shaping delay as a function of the inverse of a predetermined peak cell rate of said first cells when said adjacent cells are both of said first type and as a function of fractions of said inverse otherwise.

The invention is based on the insight that, through an appropriate choice of the mentioned fractions, shaping the cells in the above way results in a mutual delay between user cells equal to the inverse of the peak cell rate negotiated for these user cells and hence to the optimal QoS whilst OAM cells are still shaped with respect to user cells. The latter particularly ensures that cell sequence integrity as well as, again through appropriately selecting the fractions, minimum cell clumping for the aggregate and individual sub-streams can be achieved without introducing gaps between user cells.

It is to be noted that in the above description the terminology "as a function of" is used to allow the shaping method to take into account a tolerance value indicating the extent to which the shaping delay may differ from the inverse or the fractions thereof. Such a tolerance value is included in the shaping method for instance when it uses the Virtual Scheduling Algorithm or VSA, which is well known in the art and wherein this tolerance value is called the allowed Cell Delay Variation or CDV and denoted with the symbol $\gamma$. The use of such a tolerance value is however not strictly needed to perform a shaping method and in this case the shaping delay is exactly equal to either the mentioned inverse or fractions thereof. In the latter case, shaping is commonly referred to as "spacing".

It is to be further noted that throughout the above it is implicitly understood that adjacent cells are received with a delay smaller than the shaping delay. As will be immediately apparent, if this is not the case, the shaping method actually does not mutually delay these cells but immediately forwards the second of the cells upon its receipt. Referring to the above remarks about the tolerance value, it is worth noting that the relevant shaping delay for the above decision not to delay a cell is always equal to the maximum shaping delay, i.e. without taking into account this tolerance value.

A characteristic feature of the present invention is that said shaping delay is derived as a function of a first predetermined fraction of said inverse when a second one of said adjacent cells is of said second type and as a function of a second variable fraction of said inverse when a first one of said adjacent cells is of said second type whilst a second one of said adjacent cells is of said first type, said second variable fraction being equal to a value which is calculated by subtracting from said inverse the number of consecutive second cells received prior to said latter cell multiplied by said first fraction when said latter value is positive.

It can be clearly seen that in choosing the above first and second fractions, it is obtained that consecutive user cells are always mutually delayed over the above inverse of their peak cell rate as required for offering an optimal QoS. However, in for the calculated value to be positive and hence in order to achieve the above delay, the number of OAM cells received inbetween user cells has to have an upper limit.

This gives rise to the following important features of the present invention which are that said first predetermined fraction is equal to said inverse divided by an integer value, and that said integer value is equal to the theoretical upper limit on the number of consecutive second cells plus one.

It may be verified that in the presence of such an upper limit, which depends on the mechanism with which both the user and the network in which the present method is used generate OAM cells, the above features give rise to a second fraction which normally may always be calculated as stated above. Furthermore with the latter feature and keeping in mind both the above upper limit as well as the restriction on the mutual delay between two consecutive user cells, the cell clumping between OAM cells as well as between user and OAM cells is minimized.

Still another characteristic feature of the present invention is that said integer value is programmable dependent on said theoretical upper limit.

In so doing the present shaping method may be used in a network in which the above upper limit is not known beforehand and wherein either distinct mechanisms generating OAM cells are used or this mechanism is as yet unspecified.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein:

FIG. 2a schematically shows a cell stream CS1 to which the present shaping method is applied; and, FIG. 2b shows a cell stream CS2 obtained by applying the present shaping method to cell stream CS1.

BEST MODE FOR CARRYING OUT THE INVENTION

Figure 1:
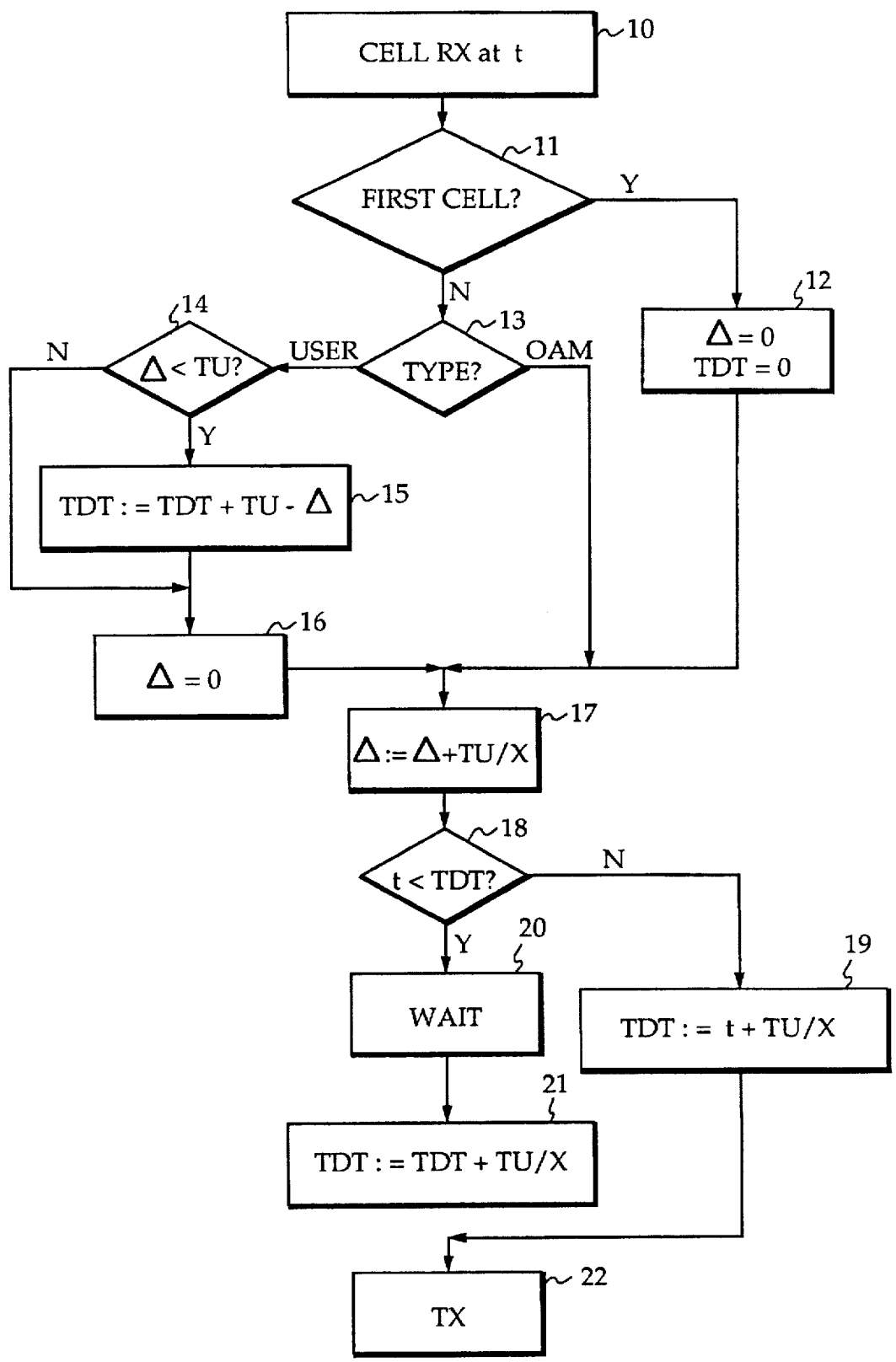
FIG. 1 depicts a flow diagram of a shaping method according to the present invention.

The shaping method whose flow diagram is shown in FIG. 1 is applied to the cell stream CS1 of FIG. 2a which is typically an output stream of a preceeding policing stage and comprises cells of a first type or user cells such as U1 to U7 and cells of a second type or operation and maintenance or OAM cells such as O1 to O6. The shaping method is needed to adjust the inter-arrival times of the cells U1–U7, O1–O6 of the cell stream CS1 so as to obtain a resultant cell stream CS2 as shown in FIG. 2b.

The latter adjustment is required since different traffic patterns for the cell stream CS1 may result from the operation of the mentioned policing stage and since it is generally desirable to allow only a specific range of such traffic patterns so as to achieve a good Quality of Service or QoS with maximum load on the network. It can thus be seen that the cell stream CS2 is characterized by a more regular traffic pattern leading to a more optimal use of resources in the network.

Two different types of shaping methods exist, i.e. a first type known as a spacing method according to which cell inter-arrival times are controlled to remain constant and a second type known as a shaping method proper wherein some delay variation, for instance according to the well known Virtual Scheduling Algorithm VSA, with regard to the theoretical cell inter-arrival time is allowed. For brevity's sake, only a spacing method is described in detail herein. No example is given of a shaping method of the second type since the principles of the present invention are readily applied to such a method by a skilled person by taking for the theoretical inter-arrival time the constant inter-arrival time considered hereinbelow.

It is further to be noted that, as e.g. described in the article "The Spacer-Controller: an efficient UPC/NPC for ATM networks", by P. Boyer et al., ISS 1992, October 1992, Vol. 2, paper A9.3, pp. 316–320, normally a plurality of such shaping methods operate in parallel, whereafter their resultant cell streams CS2 are multiplexed on the same link via an output buffer (not shown). The latter is not described in any detail herein, it being presumed that transmission times considered below correspond to the times at which a cell is queued in the mentioned output buffer.

The shaping method shown in FIG. 1 is carried out sequentially for each cell U1–U7, O1–O6 received in a first step 10 of the shaping method and for each cell so received the arrival time t of this cell at the shaping method is used thereby. For brevity's sake it is considered hereinbelow that this time t is zero at the time the first cell U1 of the cell stream CS1 is received. It is to be further noted that for a good understanding of the method it is necessary to describe the two parameters TU and X used thereby. Firstly, TU is a constant inter-arrival time between two user cells as calculated from the peak cell rate of these user cells which is negotiated at call set-up. Secondly, (X–1) is equal to the upper limit on the number of both user and network generated OAM cells that may come inbetween two consecutive user cells. Depending on the mechanism with which these OAM cells are generated, i.e. dependent upon the burst length allowed for these cells, the parameter X may vary from 1 to 64.

After receipt of a cell of CS1, i.e. after step 10, it is checked in step 11 whether the received cell is a first cell of CS1 or not. If this is answered in the affirmative Y, the variables $\Delta$, an accumulated delay since the receipt of a previous user cell, and TDT, a theoretical departure time for the presently handled cell, are initialized at zero. When it is not the first cell of CS1, case N, another check of this cell is performed in step 13.

This check consists in determining the type of the cell, i.e. whether it is a user or an OAM cell. In case it is a user cell, case USER, a further check is performed in step 14. In this check it is determined whether or not $\Delta$ is smaller than TU and if this is answered in the affirmative Y, a step 15 is executed in which TDT is made equal to a previous value of TDT plus TU and minus $\Delta$. In the other case N, the method jumps to a reset step 16 which is also executed after step 15 and in which the value of $\Delta$ is reset to zero.

In case the present cell was found, in step 13, to be an OAM cell, case OAM, the method proceeds with step 17 which is also executed after both steps 12 and 16 considered already hereinabove. In this step 17, the accumulated delay is updated by setting it equal to the previous value of this delay $\Delta$ plus TU/X. After so accumulating this delay $\Delta$ in step 17, it is checked in a following step 18, whether or not the present cell was received prior to the time indicated by the present value of TDT by checking whether or not t is smaller than TDT. If the cell was not so received, case N, a new TDT value is calculated with respect to a next cell to be handled by the shaping method in step 19 by adding TU/X to the time t at which the present cell was received. After this step 19, the cell is transmitted by executing step 22.

If, instead, the cell was received in time, case Y in step 18, the method jumps to a step 20 wherein a wait procedure is executed waiting until the time indicated by the present value of TDT is reached. After this waiting procedure, a new TDT value is calculated so as to properly transmit the next cell to be handled by the method by adding TU/X to the previous value of TDT in a step 21.

After this step 21, the present cell is transmitted by again executing step 22 after which transmit operation the shaping method directly starts again at step 10 when the next cell was already received whilst executing the method for the present cell. When the next cell has not been received in the meanwhile, the method waits for the receipt of this next cell before once again executing the above flow diagram starting at step 10.

As will be apparent from the above description, the above flow diagram results in the rearrangement of the cell stream CS1 of FIG. 2a into cell stream CS2 of FIG. 2b which is discussed in more detail hereafter.

For the first user cell U1 and because of the above assumption that this cell U1 is received at t=0, the shaping method results in transmitting it also at t=0 since the check performed in step 18 is negative N. After handling this cell U1, the variables TDT and Δ are both equal to TU/X due to the steps 12 and steps 17 and 19 respectively. In this example, and as can be seen from FIG. 2b, TU equals 6 cell time slots whilst X=3 which means, for example, that the peak cell rate of the user cells U1–U7 is equal to e.g. 155 Mbit/s divided by 6 if the mentioned cell time slots correspond to a 155 Mbit/s link whilst the number of consecutive OAM cells O2–O3 between two consecutive user cells U5–U6 has as a theoretical upper limit (X−1), i.e. maximally 2.

For the next cell U2, received at t=5, the step 13 reveals that it is a user cell and therefore in step 14, it is checked whether the accumulated delay Δ is smaller than TU which in this case holds such that TDT is recalculated in step 15. This step results in a TDT value for U2, referred to in FIG. 2b as TDTU2, equal to TU and as can already be seen this calculation together with the accumulated delay Δ result in a mutual delay between consecutive user cells U1–U2 of TU. Further for this cell U2, step 17 reveals that it is received in time, i.e. that t=5 is smaller than TDTU2=TU=6, whereafter the wait procedure of step 20 is executed resulting in a wait time of exactly TDTU2−t=1 cell time slot. After this wait step the cell U2 is eventually transmitted and the method for this cell finished with values of TU/X and TU+TU/X for Δ and for TDT respectively.

The following cell U3, received at t=13, is handled in much the same way as the previously described cell except that in this case the calculated TDT value TDTU3 is equal to 2*TU and is hence smaller than t=13 such that step 18 reveals that cell U3 is not received in time. Therefore for this cell U3 step 19 is executed updating the value of TDT to t+TU/X, i.e. to 13+2=15 and immediately transmitting this cell within cell stream CS2 i.e. at time t=13.

For the following cell U4, received at t=17, the same operation of the shaping method as for the cell U4 is followed which this time results in a TDT value TDTU4 equal to 19 and therefore in a wait procedure of TDTU4−t=2 cell time slots as well as in a final TDT value calculated in step 21 of TDTU4+TU/X=21 and a Δ of TU/X.

The following cell O1 is received at t=19 and found to be an OAM cell in step 13. For such an OAM cell O1, and in contrast to previous user cells U1–U4, the accumulated delay Δ is not reset but further accumulated with a value TU/X such that after handling this cell O1, this delay equals 2*TU/X. Also the value for TDT calculated at the end of handling the previous cell U4 is taken without further ado as the theoretical departure time TDTO1 relative to O1. In this case and because t=19 is smaller than TDTO1=21, this results in waiting 2 cell time slots and transmitting O1 at t=21 after updating the TDT value to TDTO1+TU/X=23 in step 21.

The shaping method then finds that a following cell received at t=20 is a user cell U5 and therefore executes the check of step 14. Since Δ=2*TU/X is smaller than TU for this user cell U5, step 15 is executed resulting in a TDT value for U5 TDTU5 which is equal to 23+6−4=25. After this, usual steps are executed for this user cell U5 resulting in a wait of 5 cell time slots such that U5 is eventually transmitted at a time t=25. Again it can be seen that the cooperation between TDT and Δ allows the over-all delay between two consecutive user cells U4 and U5 to be determined as TU regardless of the number of OAM cells handled between them. After processing of U5 and due to steps 16, 17 and 21, TDT is made equal to 25+2 and Δ to TU/X.

The following cells O2 and O3 are both found to be OAM cells in step 17 such that they are delayed with respect to their predecessor U5 and O2 respectively over TU/X which results in respective TDT values TDTO2=27 and TDTO3=29 which are also the respective transmit times of O2 and O3 as they are both received in time. It is to be noted that after cell O3 has been handled, TDT is equal to 31 and Δ to TU such that the following cell U6, which is again a user cell is sent at the above value of TDT, hence equal to TDTU6, without having to recalculate TDT since Δ is found to be equal to TU in step 14. It can be seen that the same remark as made above with respect to U2 and U5 can now be made with regard to the delay of U6 with respect to U5.

Finally, a last string of cells O4–O6, U7 is shown in order to show the reaction of the present shaping method when more consecutive OAM cells O4–O6 as would be allowed in view of the above upper limit would still be received, which in this case means that 3 or more consecutive OAM cells such as O4–O6 are received. If this is the case, it may be verified that the accumulated delay Δ is larger than TU after handling the last of these OAM cells O6 such that for these OAM cells as well as for the user cell U7 following them, the TDT value is used which is calculated when handling the preceeding cell in step 21. This means in particular that such cells O4–O6, U7 are all sent with mutual delays of TU/X which verifiably is the smallest delay which can be achieved for these cells in view of the above theoretical upper limit and which most importantly introduces a minimum gap, or mutual delay in excess of TU, between user cells such as U6 and U7.

While the principles of the invention have been described above in connection with specific apparatus, it is to be clearly understood that this description is made only by way of example and not as a limitation on the scope of the invention.

What is claimed is:

1. A method of shaping a cell stream (CS1) comprising first (U1–U7) and second (O1–O6) types of cells and including the step of mutually delaying adjacent cells (U1–U2) of said cell stream over a shaping delay if the cells are received within said shaping delay, characterized in that said method uses variable time intervals between consecutive cells by including a step of deriving said shaping delay as a function of an inverse (TU) of a predetermined peak cell rate of said first cells (U1–U7) when said adjacent cells are both of said first type and as a function of fractions (TU/X) of said inverse otherwise.

2. A method according to claim 1, characterized in that said shaping delay is derived as a function of a first predetermined fraction (TU/X) of said inverse when a second one of said adjacent cells is of said second type (O1–O6) and as a function of a second variable fraction of said inverse when a first one of said adjacent cells is of said second type whilst a second one of said adjacent cells is of said first type (U1–U7), said second variable fraction being equal to a value which is calculated by subtracting from said inverse the number of consecutive second cells received prior to said latter cell multiplied by said first fraction when said latter value is positive.

3. A method according to claim 2, characterized in that said second variable fraction equals said first fraction (TU/X) when said value is zero or negative.

4. A method according to claim 3, characterized in that said first predetermined fraction (TU/X) is equal to said inverse (TU) divided by an integer value (X).

5. A method according to claim 4, characterized in that said integer value (X) is equal to the theoretical upper limit on the number of consecutive second cells (2) plus one.

6. A method according to claim 5, characterized in that said integer value (X) is programmable dependent on said theoretical upper limit.

7. A method according to claim 1, characterized in that said stream (CS1) is an Asynchronous Transfer Mode cell stream, cells of said first type (U1–U7) being user cells and cells of said second type (O1–O6) being operation and maintenance cells.

* * * * *